United States Patent
Sobotta

[11] 3,904,288
[45] Sept. 9, 1975

[54] PHOTOGRAPHIC SLIDE PROJECTOR

[75] Inventor: Reinhard Sobotta, Mascherode, Germany

[73] Assignee: Rollei-Werke Franke & Heidecke, Braunschweig, Germany

[22] Filed: Mar. 1, 1974

[21] Appl. No.: 447,280

[30] Foreign Application Priority Data
Mar. 15, 1973  Germany............. 2312791

[52] U.S. Cl. .............................................. 353/118
[51] Int. Cl.² ....................................... G03B 23/02
[58] Field of Search ........... 353/103, 111, 112, 113, 353/115, 118

[56] References Cited
UNITED STATES PATENTS

| | | | |
|---|---|---|---|
| 1,611,843 | 12/1926 | Van Altens | 353/118 |
| 2,460,359 | 2/1949 | Page | 353/118 |
| 2,705,439 | 4/1955 | Waller | 353/118 |
| 2,936,672 | 8/1960 | May | 353/111 |

FOREIGN PATENTS OR APPLICATIONS

| | | | |
|---|---|---|---|
| 1,295,233 | 5/1969 | Germany | 353/115 |
| 1,109,406 | 6/1961 | Germany | 353/115 |

Primary Examiner—Richard E. Aegerter
Assistant Examiner—A. J. Mirabito
Attorney, Agent, or Firm—Stonebraker, Shepard & Stephens

[57] ABSTRACT

A photographic slide projector of the type in which successive slides are taken from the front end of a stack of slides, as distinguished from slides held in individual compartments, and each slide after projection is delivered back to the rear end of the stack. The front slide of each stack is raised by a gripping or lifting member and placed in the space between a gate guide and a clamp, the clamp then being closed to hold the picture slide tightly. The gate guide and clamp together are then raised to a projection position lying in the optical projection axis. When projection of this slide is completed, the guide and clamp are raised still further, and the clamp is moved away from the gate guide, thus releasing the slide which falls by gravity into a chute which delivers it to the rear end of the stack.

12 Claims, 3 Drawing Figures

3,904,288

PHOTOGRAPHIC SLIDE PROJECTOR

BACKGROUND OF THE INVENTION

In many picture slide projectors, successive slides are taken from individual compartments in a magazine or tray, moved into projection position on the optical axis, and then when projection is completed, each slide is moved back into the same individual compartment from which it was taken. But there is another type of projector, also well known in the art, in which the slides are not placed in individual compartments in a magazine, but are loosely stacked in contact with each other, with no intervening partitions. The first slide in the stack is taken from the stack, projected (that is, placed in the optical axis), and then replaced at the rear end of the stack. It is to this second type of projector, that is, the stacked slide type rather than the compartment type slide, that the present invention relates.

Typical examples of projectors of this general type, feeding successive slides from a stack, are the projectors disclosed in U.S. Pat. Nos. 3,292,288, issued Dec. 20, 1966, and 3,411,227, issued Nov. 19, 1968, both for inventions of the present applicant. The present application may be considered as being at least partly in the nature of an improvement on the structures shown in applicant's prior patents above mentioned.

In many of the prior structures of this type, including the structures disclosed in the above mentioned patents, successive slides taken from the front of the stack are pushed upwardly in a guide channel, each slide pushing upwardly on the slide immediately above it, until finally, after two or three feeding operations, the first slide initially taken from the front of the stack reaches projection position in the optical axis. Then when projection of all of the slides in the stack is completed, if one wishes to return all of the slides to the stack so that the stack container can be removed and another stack container substituted, it is necessary to provide two or three or more dummy slides or test slides, which serve to push the last one of the wanted picture slides upwardly out of the projection gate so as to be returned to the stack.

One of the objects of the present invention is to provide a mechanism which does not require any dummy slides or test slides, and in which the last projected slide is safely returned to the rear of the stack without the need for any supplementary slides, parts, or mechanism, so that the container for the stack of slides can be removed from the projector with assurance that all of the slides are in the stack and this collection of slides is complete. Another container for another stack may then be placed in the projector if desired.

Another object of the invention is the provision of mechanism so designed as to obviate the need for the guideway previously provided for guiding slides upwardly step by step from the stack of slides to the projection position.

The prior projectors of the kind mentioned sometimes work incorrectly when the slides are frayed or worn or rounded at the corners, as there is a tendency for one such slide to slip past the slide above it rather than making a good contact with the lower edge of the slide above it so as to raise such slide upwardly. Accordingly, still another object of the invention is the provision of improved mechanism which will operate satisfactorily with slides which are frayed or worn or rounded at the corners, and will not permit faulty operation of the kind experienced in the past.

SUMMARY OF THE INVENTION

The present invention provides two arms extending in a generally horizontal direction, pivoted for upward and downward swinging movement on a common axis. One of these arms carries what may be called a slide gate guide, or projection gate member, pivoted to a clamp spring pressed toward the guide, so as to hold an intervening picture slide frictionally between the guide and the clamp. The other swinging arm carries a gripper or lifting device. At the beginning of operation, the two arms swing downwardly toward the front one of the stack of slides which is arranged below the projection axis. The gate guide stops just above the upper edge of the first slide in the stack, the clamp being moved away from the gate guide at this time to provide a slide-receiving space between them. The gripper or lifting member continues further downwardly until a ledge on this member snaps beneath the bottom edge of the first slide in the stack. Then the lifting member moves upwardly to elevate the first slide from the stack into a position between the gate guide and the clamp, after which both of the swinging arms move upwardly together, and the clamp closes against the slide to hold it in position. The upward movement continues until the picture slide is brought into properly centered position in the optical projection axis.

When projection of this slide is completed, the gate guide and the clamp, with the picture slide clamped between them, move further upwardly above the optical projection axis, and the clamp is opened so that the picture slide drops by gravity into a chute which conveys it to the rear end of the stack of slides. The two swinging arms then move downwardly again, and the process is repeated, picking up the first slide from the stack, elevating it to projection position, then elevating it further and releasing it to fall into the return chute and return by gravity to the rear end of the stack.

DESCRIPTION OF THE PREFERRED EMBODIMENT

Figure 1:
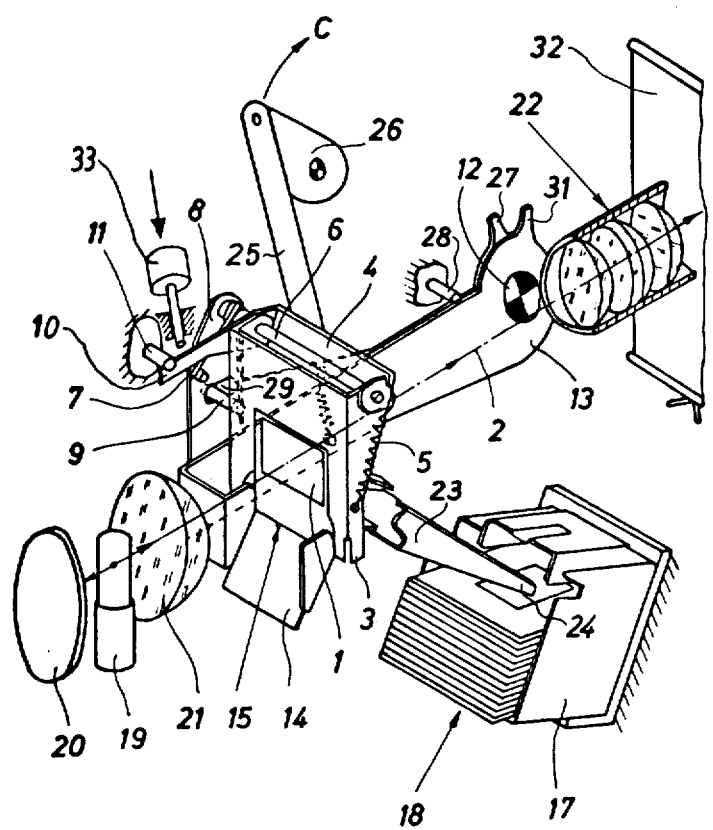
FIG. 1 is a schematic perspective view of the projector parts necessary to an understanding of the invention, illustrating the parts in projection position, with a picture slide centered on the optical projection axis.

Referring first to FIG. 1, a picture slide 1 is shown in projection position, situated in the optical axis or path of the light beam 2, held in position between a slide gate guide 3 and a clamp 4. A relatively strong spring 5 tends to move the clamp 4 toward the slide gate guide 3, to hold the picture slide 2 frictionally between these two members.

A transverse shaft 6 serves as the fulcrum for both of the members 3 and 4, which are pivoted near their upper edges to swing on this shaft. The shaft 6 has its left end (when viewed as in the drawings) firmly fixed to an upward extension or flange on the rocker arm 8 which is pivoted on the stationary pivot 12, for upward and downward swinging movement in a vertical plane offset laterally from and approximately parallel to the optical axis 2. A second rocker arm 13, further described below, is pivoted on this same pivot or fulcrum 12 and lies right along side the first rocker arm 8, in sliding frictional contact therewith.

The slide gate guide 3 is U-shaped, and the ends of its branches, which terminate at a right angle, are provided with inlet slants. A pin 9 fixed to the gate guide 3 and extending leftwardly from the left edge thereof, passes through a slot 29 in the upstanding web of the rocker arm 8, the ends of the slot serving as abutments to limit the extent to which the guide member 3 can swing forwardly and backwardly (in the direction of the optical axis) on its fulcrum 6. A light spring 7, weaker than the spring 5, is wound around the fulcrum shaft 6 and has one arm reacting against a fixed pin on the rocker arm 8 and the other arm of the spring 7 presses rearwardly on the pin 9 of the gate guide 3, tending to swing the gate guide 3 rearwardly (clockwise on its fulcrum 6) to the limit position determined by engagement of the pin 9 with the rear end of the slot 29.

At the left edge of the clamp member 4, the rearwardly bent ear which supports the clamp member on the fulcrum shaft 6 is prolonged rearwardly at 10 to form what may be called a control arm or a stop lug, cooperating with the stationary pin 11. When the rocker arm 8 is at a sufficiently low position so that the arm 9 does not engage the pin 10, the spring 7 keeps the gate guide member 3 and the clamp member 4 swung to their rear limit positions. When the rocker arm 8 moves upwardly beyond the position where the arm 10 first makes contact with the fixed pin 11, the continued upward movement will swing the arm 10 counterclockwise, first swinging the gate guide 3 and clamp 4 forwardly (the spring 5 being stronger than the spring 7) and then on continued upward movement, when the pin 9 has reached the forward end of the slot 29 and the gate guide member 3 can swing no farther, the clamp member 4 will swing forwardly away from the gate guide member 3.

The above mentioned second rocker arm 13 carries near its rear end a gripping device 14 which is so constructed that when the picture slide 1 is in the projection position, the upper edge 15 of the gripping device engages the bottom edge of the picture slide 1. The rocker arm 8 which carries the gate guide and clamp and the rocker arm 13 which carries the gripping device are resiliently connected to each other by the spring 16 (FIGS. 2 and 3) in addition to which they are frictionally engaged with each other in a snug side by side relation, so that when the rocker arm 13 is swung upwardly or downwardly, it tends to carry the other rocker arm 8 with it. When these two rocker arms are in or near their uppermost positions, a removable and replaceable slide stack container 17 may be put in or removed from its position beneath the optical axis, as illustrated. This container 17 contains any desired number of loose slides 18 obliquely stacked together.

The projection system may include a projection lamp indicated schematically at 19, a reflector 20, a condenser lens 21, and a projection lens system 22, all being conventional. The details of the projection system are unimportant for purposes of the present invention, and may be widely varied. When a picture slide 1 is in projection position at the optical axis 2, as illustrated in FIG. 1, the conventional elements 19, 20, and 21 cast an intense beam of light on to the slide 1, and the illuminated image on the slide is then projected through the lens 22 onto any suitable projection screen or receiving surface indicated schematically at 32.

A slide return chute 23 is held in stationary position in the projector by any suitable bracket (not shown), the upper end of the chute being a little forwardly of the bottom edge of the picture slide when it is in projection position, and the lower end of the chute being positioned to deliver a slide, falling by gravity in the chute, to the rear end of the stack of slides 18 in the container 17. The chute is somewhat like a funnel, the upper opening being quite large, the dimensions of the chute tapering or converging to a smaller size as indicated at 24.

A thrust rod or operating link 25 has its lower end pivoted to the rocker arm 13 and its upper end mounted on a crank pin on the crank 26 which is turned intermittantly by any suitable operating mechanism in the projector.

A lug 27 on the rocker arm 8 engages a fixed stop pin 28 to limit the extent of downward swinging of the rocker arm 8. Another stop lug 31 on the second rocker arm 13 engages the same fixed stop pin 28 to limit the downward swinging of the second rocker arm. A limit pin 30 on the first rocker arm 8 projects laterally over the top edge of the second rocker arm 13 and serves to limit the extent to which the second rocker arm can move upwardly relative to the first rocker arm. The above mentioned spring 16 is conveniently connected at its upper end to this same pin 30 to pull downwardly on this pin while the lower end of the spring is connected to the lower pivot of the link 25 to pull upwardly on this pivot.

A manually operable ejection button 33 is provided, in such position that when the button is pushed downwardly, the lower end of its stem engages and pushes downwardly on the stop lug or control arm 10, thereby swinging the clamp 4 away from the gate guide 3 so that the slide may drop out.

The operation of the slide projector is as follows:

Assuming that a slide is in projection position, the parts will be in the position illustrated in FIG. 1. The crank 26 will be stationary, in an intermediate position approaching but not yet at its upper dead center position.

When it is desired to change to the next slide, the crank 26 is rotated clockwise, in the direction of the arrow C. This pulls upwardly on the link 25, raising the rocker arm 13, which in turn raises the first rocker arm 8 by engagement with the limit pin 30. As these two rocker arms rise, the action of the stationary stop 11 on the stop lug or control arm 10 causes the gate assembly (members 3 and 4 together) to swing counterclockwise on the fulcrum shaft 6, moving the lower ends of these members 3 and 4 somewhat forwardly to a position in which the bottom of this assembly is directly over the open upper end of the return chute 23, 24. Then as upward movement continues, the gate member 3 can swing no further forwardly because the pin 9 has reached the forward end of the slot 29, but now the clamp 4 swings forwardly without the gate 3, opening the space between the members 3 and 4 so that the slide 1 falls by gravity into the upper end of the return chute and is delivered thereby to the rear end of the loose stack of slides 18. That is, it is delivered to what may be called the rear end of the stack when considering the slides in the order in which they are projected, but it is actually the front end of the stack when the slides are considered in the position of orientation in the projector, since this end is closer to the front of the projector and the new slides to be projected are taken from the end of the stack which is closer to the rear end of the projector.

The forward swinging of the lower edges of the two members 3 and 4, as the crank 26 approaches its upper dead center position, not only places the slide directly over the return chute, but also moves the lower edge of the slide forwardly relative to the supporting edge 15 of gripping device 14, so that when the gate guide structure or assembly 3, 4 opens to permit the slide to drop, the dropping of the slide is not impeded by the gripping device 14, 15. The parts are approximately in the position shown in FIG. 2. As the crank 26 begins to turn a little beyond its upper dead-center position, the clamp 4 begins to close rearwardly toward the gate guide 3 before the bottom edges of the members 3 and 4 swing rearwardly toward the gripping device 14. This is a convenient place to stop the rotation of the crank 26 if one wishes to stop the projection sequence in order to remove the slide stack container 17 from the projector and substitute another slide stack container with different slides. Hence this position illustrated in FIG. 2, just beyond the upper dead center position, may be considered as the rest position of the projector. It is noted that no slide is in the gate assembly, all of the slides now being in the stack container 17, thus obviating the difficulties previously encountered in the prior art by having to use a plurality (usually three) of blank slides or test slides in order to get the last picture slide out of the slide gate of the projector and back into the stack. If perchance a slide tends to stick in the gate assembly instead of dropping into the chute as it should, the manual release button 33 may be depressed, manually opening the clamp 4 to a greater extent than the normal mechanical opening movement thereof, so that the stuck slide will drop out.

Figure 2:
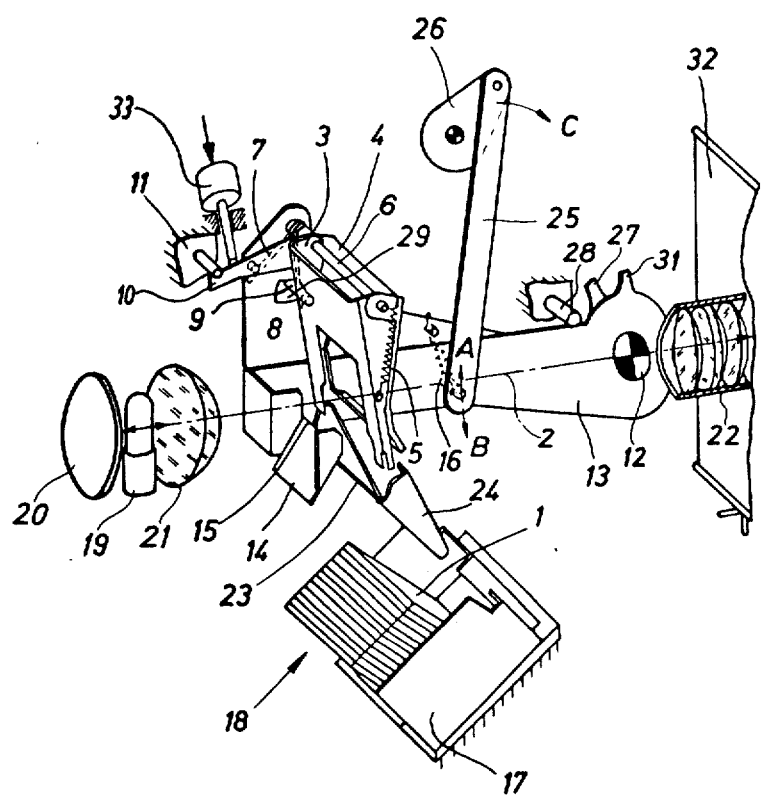
FIG. 2 is a similar view with the parts in a later stage of the cycle, releasing the picture slide to drop into the return chute for return to the rear end of the stack of slides.

When projection is to continue, either with the next slide in the existing stack 18, or with the first slide in a newly inserted container of slides, rotation of the crank 26 is continued in the same clockwise direction indicated by the arrow C, going onward from the rest position shown in FIG. 2. The link or rod 25 thus moves the second rocker arm 13 downwardly, and first rocker arm 8 moves downwardly with it, both because of the frictional engagement of the two arms and because of the action of the spring 16 in pulling downwardly on the arm 8. In the first part of the downward movement, after the clamp member 4 has swung rearwardly against the gate member 3, both members together swing rearwardly (at their lower edges) so as to clear the upper end of the chute 23, this swinging movement being performed under the influence of the light spring 7. This brings the lower edges of the gate assembly 3, 4 directly over the upper edge 15 of the gripping device, and at this time these parts are once more in the projection position, but there is no slide in the gate at this time. The rotation of the crank does not stop in this position, but continues, and the downward swinging of the rocker arms 8 and 13 continues, the link 25 moving downwardly in the direction of the arrow B. The downward swinging of the first rocker arm 8 is stopped by engagement of the lug 27 on this arm with the stationary stop pin 28, in a position in which the lower end of the gate guide assembly 3, 4 is directly over and close to the upper edge of the first slide in the stack 18. The other rocker arm 13 continues its downward movement in the direction of the arrow B, meanwhile stretching the spring 16, so that the inclined or oblique lower portion of the gripping device 14 engages the upper edge of the first slide and displaces this slide slightly forwardly against the force of gravity which is acting on the slides. The gripping device 14 continues downwardly until the upper edge 15 of gripping device snaps beneath the lower edge of the first slide. The crank 26 is now in its lower dead center position, and as rotation continues, the link 25 begins to draw upwardly on the rocker arm 13, moving in the direction of the arrow A.

The engagement of the upper edge 15 of the gripping device with the lower edge of the slide thus raises the slide, forcing the upper edge of the slide in between the members 3 and 4, which are held together by the action of the spring 5. As above mentioned, the cooperating lower edges of the members 3 and 4 are rounded and formed as a tapered throat into which the upper edge of the raised slide enters easily, overcoming the force of the spring 5 and pushing the members 3 and 4 far enough apart (at their lower edges) to receive the new slide. The bent inlet at the lower end of the clamp member 4 prevents the second slide, situated behind the first slide, from moving up with the first slide on account of the friction between them. The force of the strong spring 5 and the considerable angle given to the inlet of the clamp member 4 are coordinated with each other in such a way that the friction between the first and second slides is never great enough to overcome the resistance caused by the strong spring 5 and to permit the second slide to come up into the gate with the first slide.

Figure 3:
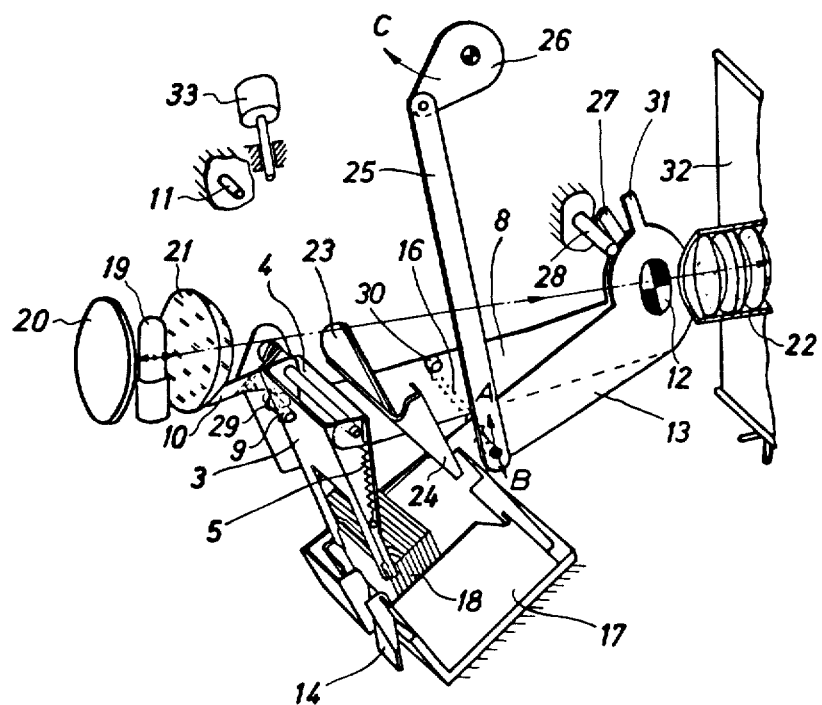
FIG. 3 is a similar view with the parts in a still later position of the cycle, ready to pick up a fresh slide from the front of the stack of slides.

During this upward shoving of the first slide into the gate structure or gate assembly, the gate assembly and its rocker arm 8 remain stationary, the rocker arm being held in its lowermost position with the lug 27 engaged with the stop 28, by the action of the spring 16. FIG. 3 illustrates the parts during the early stage of the upward movement of the gripping device, the gate assembly still being stationary in its lowermost position. When the gripping device has been moved upwardly far enough to move the first slide fully into the gate assembly, the upper edge of the rocker arm 13 comes into contact with the pin 30 on the first rocker arm 8, and both rocker arms then move upwardly together, the spring 16 still being stressed. While the gripping device 14 and the gate assembly are moving upwardly, the stack of slides 18 in the container 17 move downwardly by gravity to the limiting abutments at the lower end of the container, so that what was previously the second slide has now become the first slide in the container, ready to be picked up by the gripping device at the next cycle of operation.

The upward movement of the two rocker arms 8 and 13, moving together, continues until the stop lug or control arm 10 just barely touches the stop 11, and the rotation of the crank 26 stops at this point, the parts now being in projection position with the picture area of the slide 1 properly aligned with the optical axis 2. The image of the picture on the screen 32 is viewed as long as desired. Then when viewing of this particular slide is completed and it is desired to project the next slide, the clockwise rotation of the crank 26 is resumed, carrying the rocker arms 8 and 13 further upwardly. As already explained, the first part of this upward motion will swing the gate assembly forwardly at its lower edge, to a position over the upper end of the chute 23, 24, and then will open the clamp 4 away from the gate member 3, allowing the slide (which is no longer aligned with and not impeded by the gripper 14, 15) to drop into the chute to be returned thereby to the rear end of the stack of slides. The cycle as above described is then repeated.

The crank 25 may be driven manually, or by an electric motor, or in any desired way. Any appropriate stop means, within the skill of the art, may be provided for stopping rotation of the crank when the parts are in the projection position illustrated in FIG. 1, and also for stopping it, when desired, when the parts are in the rest position illustrated in FIG. 2, with all slides returned to the stack 18 in the container 17, this being the appropriate position for removing the slide container 17 and inserting another slide container in the projector. There is normally no need to stop the cycle of operation in this rest position when slides are being successively projected, this position being used only for removal or insertion of a fresh stack of slides. Removal of the slide container is physical possible when the cycle has stopped at the projection position (FIG. 1) but if the stack is removed at this time, one slide is still located in the projection gate and so will not be in the stack container. If the operator forgets the normal operation and removes the stack when the parts are in projection position, and then realizes his mistake, he can press the manual button 33 to release the slide from the gate, and then can reach into the projector and remove this slide manually.

In an advantageous further development of the invention, supplementary return chutes may be provided above the return chute 23, 24 described above, the supplementary chutes being approximately parallel to the chute 23, 24 and serving to return slides to a position farther toward the front of the projector. This makes it possible to use slide stack containers 17 of different sizes, to hold different lengths of stacks of slides, that is, different numbers of slides in the stack. When one or more supplementary return chutes are used, the stationary stop 11 must be replaced by a series of stops capable of selective use, one for each chute, these stops being at different heights. The stops not to be used may be withdrawn laterally from the path of travel of the stop lug or control arm 10, so that this lug, during upward travel, will not engage the stops associated with lower return chutes which are not being used, but will engage only with the higher stop which is to control the movement of the parts for delivering the projected slides into the particular return chute which is being used, appropriate to the length of the stack of slides. The longer the stack of slides in the container, the higher up would be the upper end or entrance end of the associated return chute.

A particular advantage of this invention resides in the fact that the slide stack container 17 can be removed from the projector after the projection of any desired one of the slides, without having to continue the projection process until all slides have been projected, and without requiring any additional sorting operation, all of the slides being arranged in the stack in the correct order, regardless of how many have been projected.

What is claimed is:

1. A photographic slide projector comprising means forming an optical projection axis, means for holding a stack of slides (18) in a position beneath said axis, a gate assembly (3, 4) for holding a picture slide in a projection position aligned with said axis and in a projection plane perpendicular to said axis so that an image of such slide may be projected along said axis, a gripping device (14) for gripping a first slide at one end of said stack (18) and moving such first slide upwardly toward said gate assembly, and means for moving said gate assembly downwardly from said projection position to a loading position just above said first slide in order to receive said first slide when it is raised by said gripping device, said gate assembly comprising (3) gate guide member 3 and a clamping member (4) movable toward each other to clamp a picture slide between the two members and movable away from each other to release the clamped slide from between the two members, said gate assembly having a rounded inlet at its lower edge, shaped to receive said first slide when raised by said gripping device and to obstruct upward movement of a second slide which may tend to move upwardly with the first slide on account of frictional engagement with it.

2. A projector as defined in claim 1, further comprising a slide return chute (23, 24) having an upper end offset in the direction of said axis from said projection plane and having a lower end positioned to return a slide to said stack, and means for swinging said gate assembly from a projection position holding a picture slide in said projection plane to a releasing position holding a picture slide above the upper end of said return chute.

3. A projector as defined in claim 2, further comprising means for releasing a picture slide from said gate assembly when said gate assembly is swung to said releasing position, so that the released slide may fall into said return chute and be delivered thereby to said stack.

4. A projector as defined in claim 1, further comprising a slide return chute (23, 24) having an upper end offset in the direction of said projection axis from said projection plane and having a lower end positioned to return a descending picture slide to said stack, means for swinging said gate assembly from a projection position holding a picture slide in said projection plane to a releasing position wherein the lower edge of said gate assembly is located over the upper end of said chute, and means for moving said clamping member away from said guide member while said gate assembly is in said releasing position, to release a picture slide from said assembly so that the released slide may fall into said return chute and be delivered thereby to said stack.

5. A projector as defined in claim 4, further comprising means for moving said gate assembly and gripping device upwardly to a position above said projection position, said means for swinging said gate assembly and said means for moving said clamping member both being operative during upward movement of said assembly above said projection position.

6. A projector as defined in claim 1, further comprising two rocker arms (8, 13) mounted for upward and downward swinging movement on a common pivot (12), said gate assembly (3, 4) being mounted on the first (8) of said rocker arms, said gripping device (14)

being mounted on the second (13) of said rocker arms.

7. A projector as defined in claim 6, further comprising an elastic connection (16) between said two rocker arms, means (27, 28) limiting downward swinging movement of said first rocker arm (8) to a position wherein said gate assembly has its lower edge just above the upper edge of said first slide, and means (25) for swinging said second rocker arm (13) farther downwardly to a position wherein an upper edge (15) of said gripping device (14) engages under the lower edge of said first slide so that subsequent upper swinging movement of said second rocker arm will move said gripping device upwardly to insert said first slide upwardly between said gate guide member (3) and said clamping member (4) of said gate assembly.

8. A projector as defined in claim 7, further comprising cooperating surfaces on said two rocker arms effective to engage each other when upward swinging movement of said second rocker arm has fully inserted said first slide into said gate assembly, so that thereafter further upward swinging of said second rocker arm will be accompanied by upward swinging movement of said first rocker arm, carrying said gate assembly upwardly with it.

9. A projector as defined in claim 8, wherein said gate guide member of said gate assembly is swingably mounted on a fulcrum on said first rocker arm to swing between a first position and a second position, and said clamping member of said gate assembly is swingably mounted on the same fulcrum to swing between a closed position and an open position relative to the gate guide member of said assembly, a relatively weak spring (7) tending to swing said gate guide member to its said first position, and a stronger spring (5) tending to swing said clamping member to its closed position.

10. A projector as defined in claim 9, further comprising an operating arm (10) on said clamping member, means for swinging said first rocker arm upwardly sufficiently to carry said gate assembly upwardly beyond its said projection position, and an abutment cooperating with said operating arm and effective during movement of said gate assembly upwardly beyond projection position first to swing said gate guide member on said fulcrum from its first position to said second position against the force of said weak spring and then to swing said clamping member from its closed position to its open position against the force of said stronger spring.

11. A projector as defined in claim 10, further comprising a manually operable button (33) engageable with said operating arm (10) to swing said clamping member to its open position.

12. A projector as defined in claim 2, further comprising a supplementary second return chute arranged approximately parallel to the first mentioned return chute, for returning slides to a receiving end of a longer stack of slides than the stack served by said first mentioned return chute.

* * * * *